(12) United States Patent
Shankar

(10) Patent No.: US 12,249,165 B2
(45) Date of Patent: Mar. 11, 2025

(54) ASSET TRACKING AND MONITORING IN TRANSPORTATION

(71) Applicant: AMETEK, INC., Berwyn, PA (US)

(72) Inventor: Uday Shankar, Herndon, VA (US)

(73) Assignee: AMETEK, INC., Berwyn, PA (US)

( * ) Notice: Subject to any disclaimer, the term of this patent is extended or adjusted under 35 U.S.C. 154(b) by 787 days.

(21) Appl. No.: 17/357,201

(22) Filed: Jun. 24, 2021

(65) Prior Publication Data

US 2021/0406566 A1  Dec. 30, 2021

Related U.S. Application Data

(60) Provisional application No. 63/043,953, filed on Jun. 25, 2020.

(51) Int. Cl.
| | |
|---|---|
| *G06T 7/62* | (2017.01) |
| *B65D 88/12* | (2006.01) |
| *G01C 21/00* | (2006.01) |
| *G01F 17/00* | (2006.01) |
| *G06Q 10/08* | (2023.01) |
| *G06V 20/59* | (2022.01) |
| *H04N 7/18* | (2006.01) |
| *G06Q 10/0639* | (2023.01) |
| *G07C 5/00* | (2006.01) |

(52) U.S. Cl.
CPC .............. *G06V 20/59* (2022.01); *B65D 88/12* (2013.01); *G01C 21/005* (2013.01); *G01F 17/00* (2013.01); *G06Q 10/08* (2013.01); *G06T 7/62* (2017.01); *H04N 7/183* (2013.01); *G06Q 10/0639* (2013.01); *G06T 2207/30268* (2013.01); *G07C 5/008* (2013.01); *H04N 7/188* (2013.01)

(58) Field of Classification Search
CPC .... G06V 20/59; G06Q 10/08; G06Q 10/0639; H04N 7/183; H04N 7/188; G01C 21/005; B65D 88/12; G01F 17/00; G06T 7/62; G06T 2207/30268; G07C 5/008
See application file for complete search history.

(56) References Cited

U.S. PATENT DOCUMENTS

| | | | |
|---|---|---|---|
| 7,769,221 B1* | 8/2010 | Shakes | G06Q 10/087 705/28 |
| 10,302,478 B1* | 5/2019 | Bennett | H04N 7/181 |
| 2007/0133980 A1* | 6/2007 | Meyers | G08B 13/1961 348/E5.042 |
| 2015/0269440 A1* | 9/2015 | Lund | H04N 23/66 348/158 |
| 2017/0251143 A1* | 8/2017 | Peruch | H04N 13/257 |
| 2019/0130417 A1* | 5/2019 | Watt | G06Q 30/018 |
| 2019/0236527 A1* | 8/2019 | Bhaumik | G06Q 10/087 |
| 2020/0024071 A1* | 1/2020 | Eisenman | G01G 23/3735 |
| 2020/0104785 A1* | 4/2020 | Ehrman | G01S 17/04 |
| 2020/0386753 A1* | 12/2020 | Somes | G01N 35/00029 |

\* cited by examiner

*Primary Examiner* — Congvan Tran
(74) *Attorney, Agent, or Firm* — Buchanan Ingersoll & Rooney PC

(57) ABSTRACT

An asset monitoring system includes a server, and a monitoring system mounted in a container. The monitoring system includes a camera, a transceiver, and a controller configured to control the camera to capture images of the inside of a container, and control the transceiver transmit the images to a server. The server is configured to process the images to determine loading data including at least one of an unused volume or an unused floor space inside the container, and transmit the loading data to a customer computer.

8 Claims, 3 Drawing Sheets

ASSET TRACKING AND MONITORING IN TRANSPORTATION

CROSS REFERENCE TO RELATED APPLICATIONS

This applications claims benefit of priority to U.S. Provisional Application No. 63/043,953, filed Jun. 25, 2020. The contents of this application is incorporated herein by reference.

FIELD OF THE INVENTION

This disclosure relates generally to asset tracking and monitoring in transportation.

BACKGROUND OF THE INVENTION

Line haul customers typically experience freight discrepancies such as loading, capacity issues, load shifts, damage claims and theft. These inefficiencies and discrepancies lead to millions in lost revenue and increased prices of goods and services.

BRIEF DESCRIPTION OF THE DRAWINGS

The drawing figures depict one or more implementations in accord with the present teachings, by way of example only, not by way of limitation. In the figures, like reference numerals refer to the same or similar elements.

SUMMARY OF THE INVENTION

Figure 1:
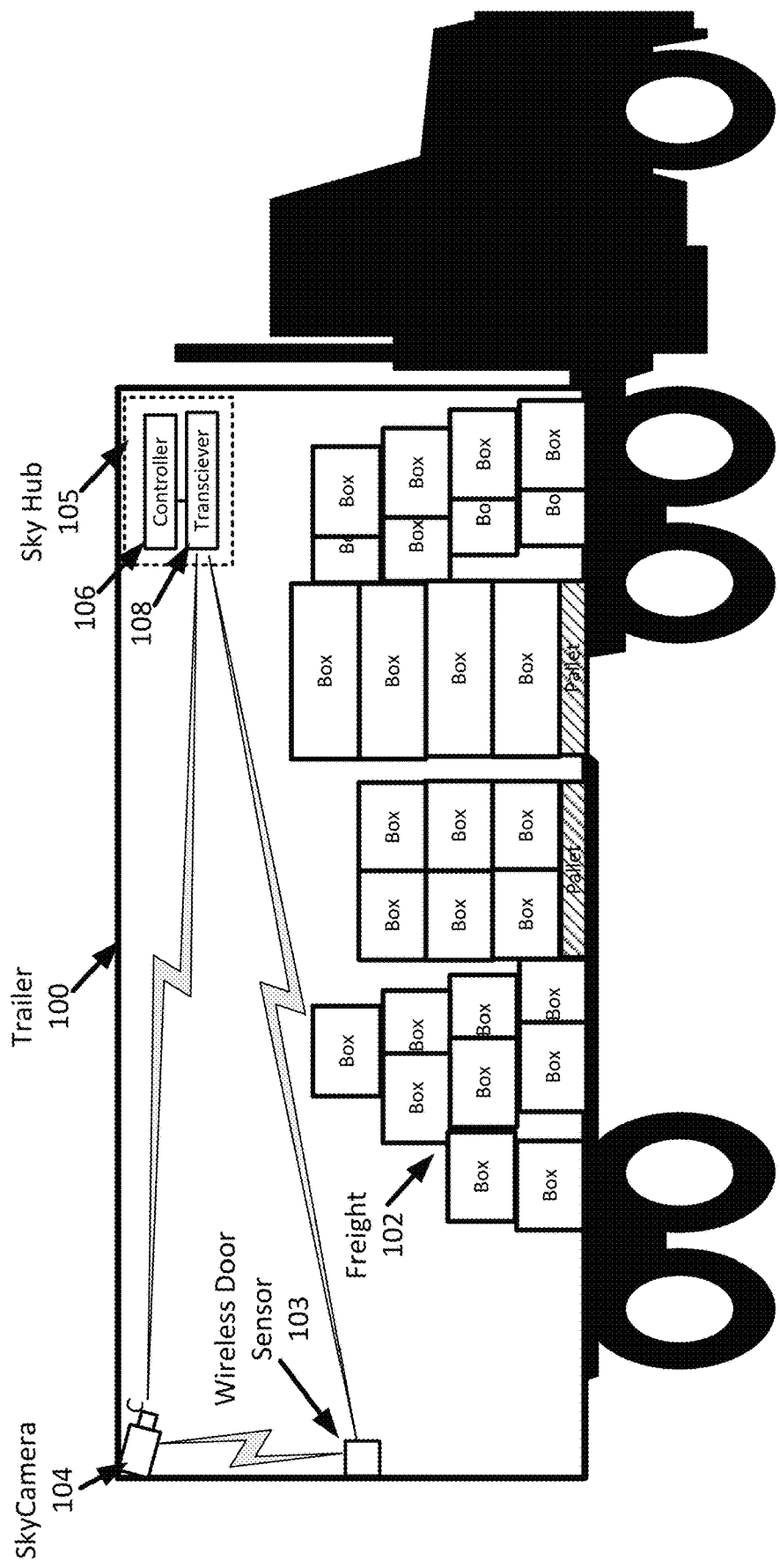
FIG. 1 shows a side view of a trailer loaded with freight and including a camera and transceiver, according to an aspect of the disclosure.

In one embodiment, an asset monitoring system includes a server, and a monitoring system mounted in a container. The monitoring system includes a camera, a transceiver, and a controller. The controller is configured to control the camera to capture images of the inside of a container, control the transceiver transmit the images to a server. The server is configured to process the images to determine loading data including at least one of an unused volume or an unused floor space inside the container, and transmit the loading data to a customer computer.

DETAILED DESCRIPTION OF THE INVENTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

An asset tracking and monitoring system is employed herein to determine load capacity data such as volumetric data and floor space data of goods (e.g. freight) located in a container (e.g., shipping container, truck trailer, warehouse, etc.). The asset tracking and monitoring system generally includes a high-resolution camera offering remote asset tracking and management to various entities including all entities within the supply chain (e.g., suppliers, distributers, manufacturers, shippers, etc.) by enhanced monitoring of utilized container capacity. In one example, the system processes the captured images to determine load capacity data such as volumetric calculations for total utilized cubic space as well as total utilized floor space within the container. This helps customers in many ways, including determining inefficiencies and improving container loading to maximize utilization of total cubic space in order to provide long-term savings to consumers and improve their entire supply chain strategy by enabling them to quickly identify issues and determine proper packaging methods with warehouses, distribution centers (DCs) and shippers. Volumetric capabilities offer precise and accurate data for shipping improvements, thereby reducing costly damage claims, as well as lost revenue and time associated with repackaging freight to help avoid claims between the entities within the supply chain and the consumer.

The asset tracking and monitoring system generally includes a monitoring system that is mounted within the container. Images of the freight within the container are captured continuously, or periodically, or based on a predetermined schedule or based on trigger rules. The captured images along with telematics data (e.g., container location, container speed, container ID, etc.) are then transmitted to a server (e.g., third party) that then processes the images to determine volumetric data. The server then makes the images along with the computed volumetric data and the telematics data available to the customer (e.g., via a web browser).

FIG. 1 shows an example of container 100 (e.g., truck trailer) loaded with freight 102 (e.g., boxes, pallets, etc.). Container 100 includes a monitoring system comprising camera herein referred to as SkyCamera 104 for capturing images of the inside of container 100, and a telematics device herein referred to as SkyHub 105 including controller 106 and transceiver 108 for receiving the images from SkyCamera 104 and then transmitting the images and telematics data to a server (not shown) for further processing. The monitoring system can be mounted to a wall of the container, ceiling of the container, or to the doors. During operation, SkyCamera 104 captures images continuously, or periodically (e.g., at predetermined intervals), or according to a predetermined customer defined schedule, or in response to a trigger. These triggers may include, but are not limited to a signal received from door sensor 103 (e.g., opening/closing of the container door), a signal received from a tractor hookup sensor (not shown), location of the container (e.g., arrival/departure from a certain location, detention time at a specific loading/unloading location), a signal from a load shift sensor, or on-demand in response to a request signal sent from the customer's device (e.g., customer PC or smartphone not shown). These images, are then transmitted wirelessly from SkyCamera 104 to SkyHub 105 which then utilizes transceiver 106 to relay the images and optional telematics data to a server (not shown) for further processing. The telematics data may be determined by sensors (not shown) within SkyHub 105. For example, SkyHub 105 may include a global positioning receiver (not shown) and an accelerometer (not shown). In another example, telematics data may be determined by sensors (not shown) on the trailer or the truck. For example, SkyHub 105 may connect to the controlled area network (CAN) bus of the truck to retrieve truck navigation information, and other data such as truck performance information (e.g., run time, speed, engine diagnostic information), etc. which may be included as part of the telematics data. In either case, the images and information are sent to the server which then processes the images to compute volumetric data that indicates how much of the container's volume is being utilized (e.g., percentage full, percentage of floor space used, etc.). This volumetric data, as well as the telematics data is then made available to the customer for viewing on their PC or smart device (not shown).

Although not shown, in one example, the monitoring system may be powered by a power source of the trailer (e.g., connected to the container electrical wiring). In another example, the monitoring device may be self-powered (e.g. battery powered, solar powered, etc.). In addition, other sensors (e.g., binary cargo sensors that detect if the container is either loaded or empty, temperature sensors, container movement sensors, load shift sensors, global positioning receivers, etc.) may be included as part of the monitoring system. The information detected by these sensors may be sent by SkyHub 105 to the server as part of the telematics data.

Figure 2:
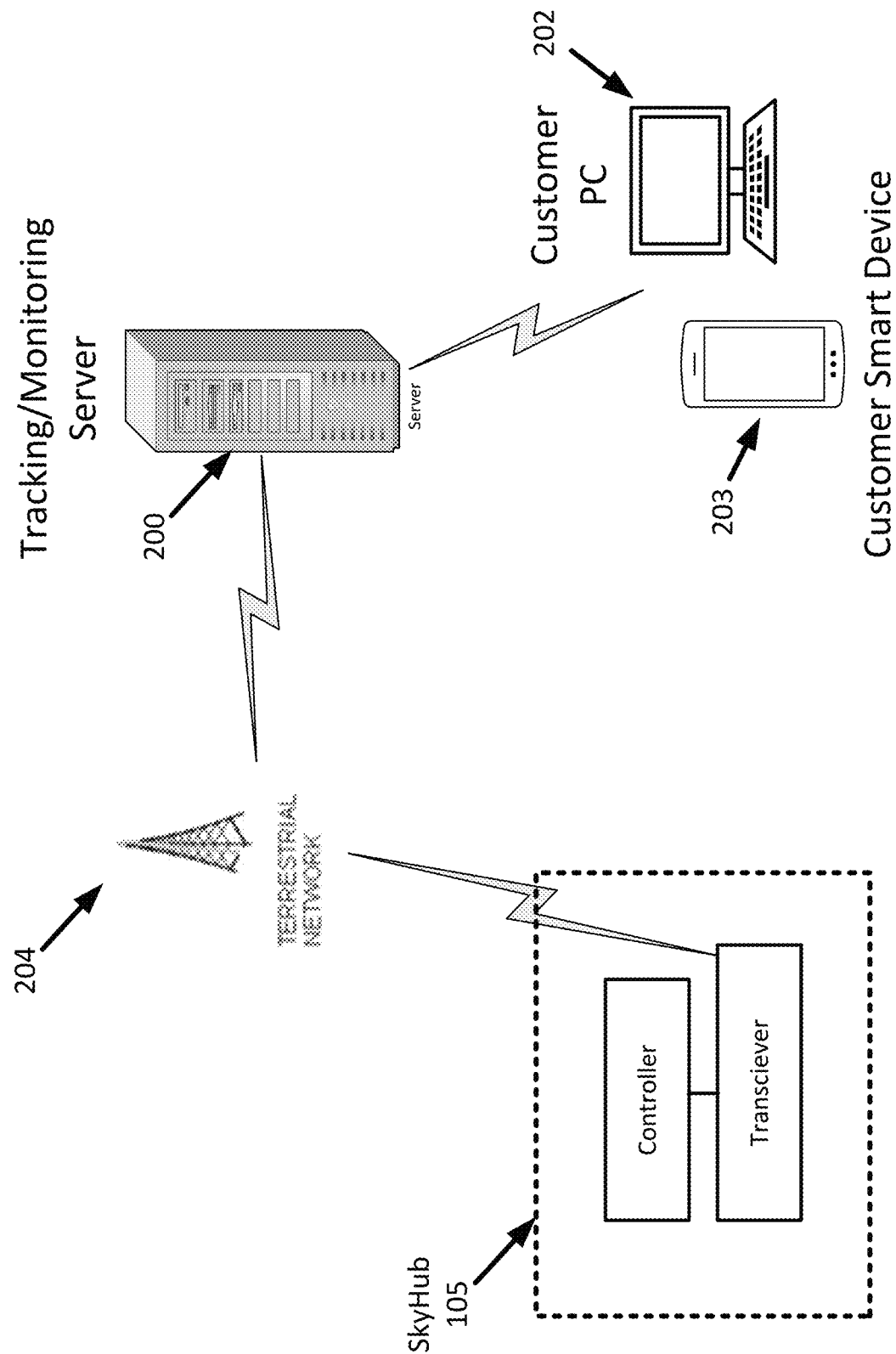
FIG. 2 shows a block diagram of the asset tracking and monitoring system, according to an aspect of the disclosure.

FIG. 2 shows a block diagram of the overall asset tracking and monitoring system that includes SkyHub 105, tracking/monitoring server 200, customer personal computer (PC) 202, and customer smart device 203. During operation, SkyCamera 104 captures images within container 100 and transmits the captured images to SkyHub 105. SkyHub 105 then receives the captured images and also determines other telematics data (e.g., container ID, container location, vehicle performance data, etc.). Container location may, for example, be determined by a global positioning satellite (GPS) receiver included as an additional component of SkyHub 105 or as a separate telematics device within the container or vehicle (e.g., truck). The images and the telematics data are then transmitted by transceiver 106 of SkyHub 105 to server 200 via a terrestrial network 204 (e.g., cellular, WiFi, etc.). Server 200 may be part of a network operation center (NOC) running an image processing algorithm for processing the images and computing the volumetric data. Server 200 may be run by the operators of the SkyCamera/SkyHub monitoring system, or by a third party. In either case, server 200 processes the received images using image processing techniques (e.g., edge detection, etc.) and machine learning techniques (e.g., supervised learning, unsupervised learning, reinforcement learning, etc.) to determine the volumetric data (e.g., percentage of the container volume that is full, percentage of floor space that is used, etc.). In one example, the customer may open web browser on customer PC 202 or a mobile application on customer smart device 203 (e.g., smartphone) to connect to server 200 in order to view, track, and monitor their assets (e.g., freight) in transit. Specifically, customer PC 202 and customer smart device 203 may retrieve the volumetric data and the telematics data from server 200, and display the retrieved volumetric data and telematics data to the customer. The customer may then use this data for various reasons. For example, if the customer is a distributor, the customer can track their assets. If the customer is a shipper, the customer can identify inefficiencies in container usage, vehicle performance, and driver performance.

In one example, the customer may use the web browser or mobile application to request specific information (e.g., % floor volume utilized) from a specific container (e.g., specific truck trailer), or may request statistical data (e.g. average % floor volume utilized) over numerous containers (e.g., truck fleet). In another example, server 200 may be configured via the web browser or mobile application to send notifications to the customer (e.g., when the container is full or empty, when the container is improperly loaded, when the container has reached a specific location, when the container is about to enter transit, when the freight has been delivered, etc.). These optional notifications may be set based on customer preferences.

Figure 3:
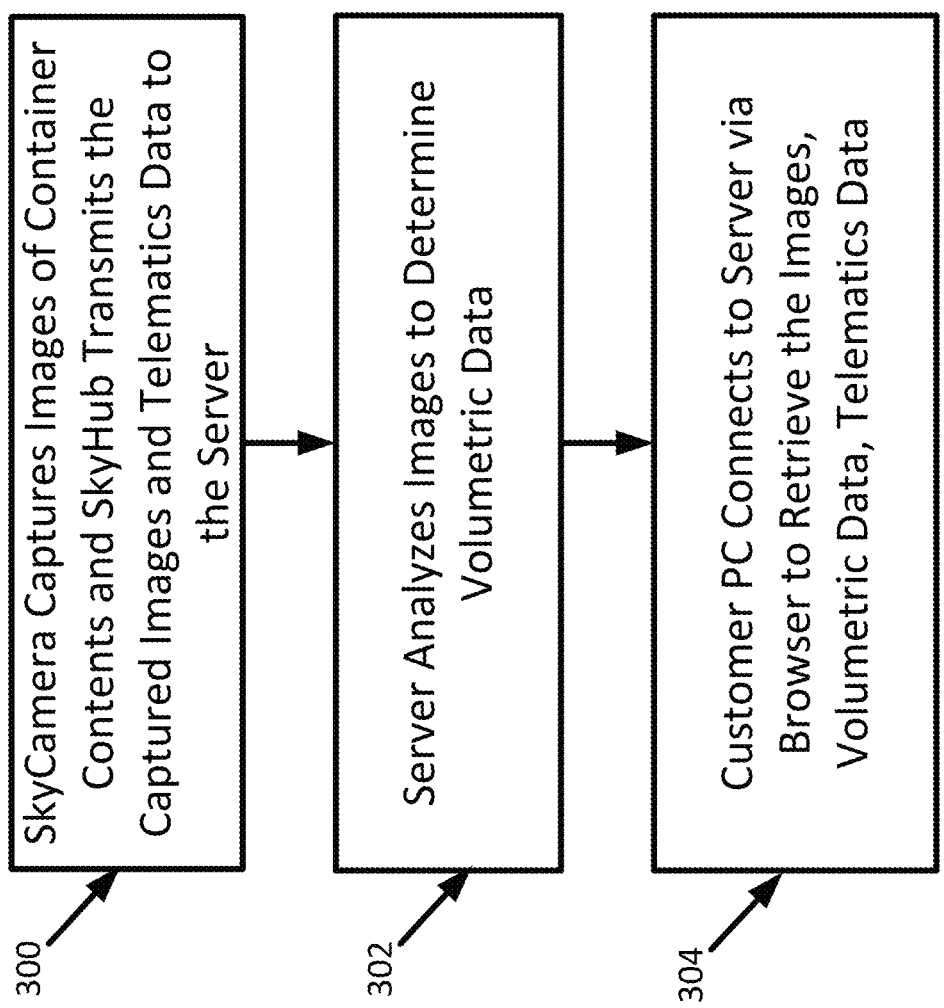
FIG. 3 shows a flowchart of the operation of the asset tracking and monitoring system, according to an aspect of the disclosure.

FIG. 3 shows a flowchart of an example operation of the asset tracking and monitoring system. In step 300, the SkyCamera 104 captures images of the container contents (e.g., in response to a trigger or schedule) and transmits the captured images to SkyHub 105. SkyHub 105 then transmits the captured images along with telematics data (e.g., container GPS location, container ID, truck performance, etc.) to server 200. In step 302, the server processes the captured images to determine volumetric data (e.g., percentage full, etc.) and makes the volumetric data along with the telematics data available to the customer PC or smart device. In step 304, the customer PC or smart device connects to server 200 and retrieves the volumetric data and the telematics data for display to the customer. Customer PC or smart device may allow the customer to retrieve this information on demand, or set alerts such that the server will notify the customer when certain conditions occur. Customer PC may also allow the customer to view the images or live video of the containers during shipping. For example, customer PC 202 or smart device 203 may send a request to SkyHub 105 via server 200 and network 204. In response to receiving the request, SkyHub 105 may instruct SkyCamera 104 to capture images or live video which are then relayed back to customer PC 202 or smart device 203.

Once inefficiencies in shipping are identified, the customer (e.g., manufacturer, supplier, distributor, etc.) may contact the shipper to notify them of the inefficiencies and to work on a solution. In another example, the customer may be the shipper itself. In one example, the shipper may use the system to monitor the manner in which its loading dock workers are loading the containers and fix any identified inefficiencies.

Although container 100 is shown in FIG. 1 as a trailer for a truck, it is noted that container 100 could be a container on any vehicle such as a train, a plane, a ship, or the like. Therefore, the monitoring system could also be used in these examples.

In yet another example, the monitoring system could also be implemented in a warehouse or the like (e.g., the system can be mounted within the warehouse to monitor the warehouse floor). This allows the customer to monitor and identify any inefficiencies in warehouse storage of products (e.g., warehouse volumetric data, floor space, etc.). The monitoring device and system may be used in any situation where 3D volumetric data is useful to a customer.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separately claimed subject matter.

What is claimed is:

1. An asset monitoring system comprising:
    a server; and
    a monitoring system mounted in a container, the monitoring system including:
        a camera;
        a transceiver; and
        a controller configured to:
            control the camera to capture images of the inside of the container,
            control the transceiver transmit the images to the server,
            wherein the controller captures and transmits the images to the server based on a door sensor trigger of the container,
    wherein the server is configured to:
        process the images to determine loading data including at least one of an unused volume or an unused floor space inside the container, and
        transmit the loading data to a customer computer.

2. The asset monitoring system of claim 1,
    wherein the controller of the monitoring device is further configured to:
        determine telematics data including at least one of a location of the container, or an identification of the container, and
        transmit the telematics data to the server, and
    wherein the server is further configured to transmit the telematics data to a customer computer.

3. The asset monitoring system of claim 1,
    wherein the controller of the monitoring device further captures and transmits the images to the server at predetermined intervals of time.

4. The asset monitoring system of claim 1,
    wherein the controller of the monitoring device is further triggered to capture and transmit the images to the server based on a location of the container.

5. The asset monitoring system of claim 1,
    wherein the server is further configured to generate an alert that the container is improperly loaded based on the determined unused volume or the determined unused floor space.

6. The asset monitoring system of claim 1,
    wherein the controller of the monitoring device further captures and transmits the images to the server based on on-demand requests by the customer computer.

7. The asset monitoring system of claim 1,
    wherein the controller of the monitoring device further captures and transmits the images to the server based on movement of the container.

8. The asset monitoring system of claim 1,
    wherein the controller of the monitoring device further captures and transmits the images to the server based on a schedule defined by the customer computer.

* * * * *